Figure 3:
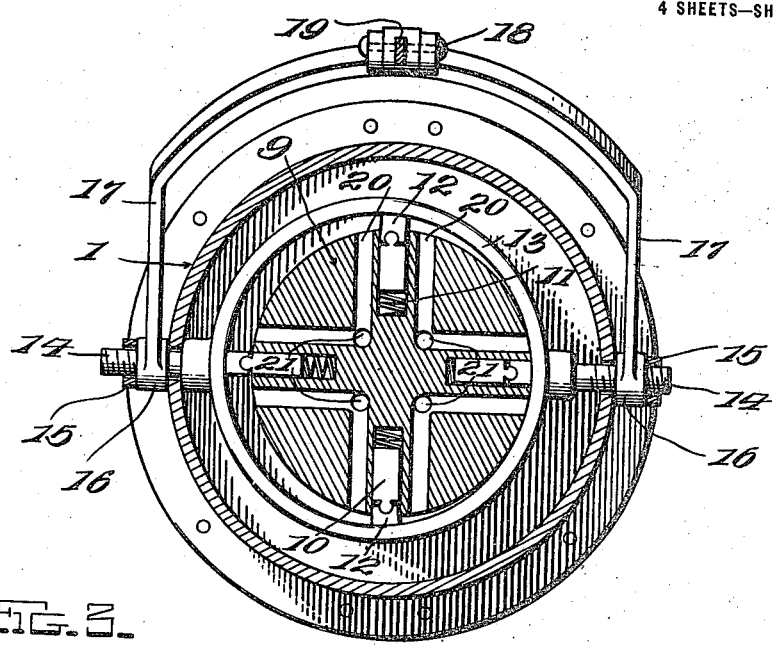

J. ZAGORA.
COMBINED FLUID TRANSMISSION AND DIFFERENTIAL.
APPLICATION FILED MAR. 30, 1914.
1,150,478.
Patented Aug. 17, 1915.
4 SHEETS—SHEET 1.
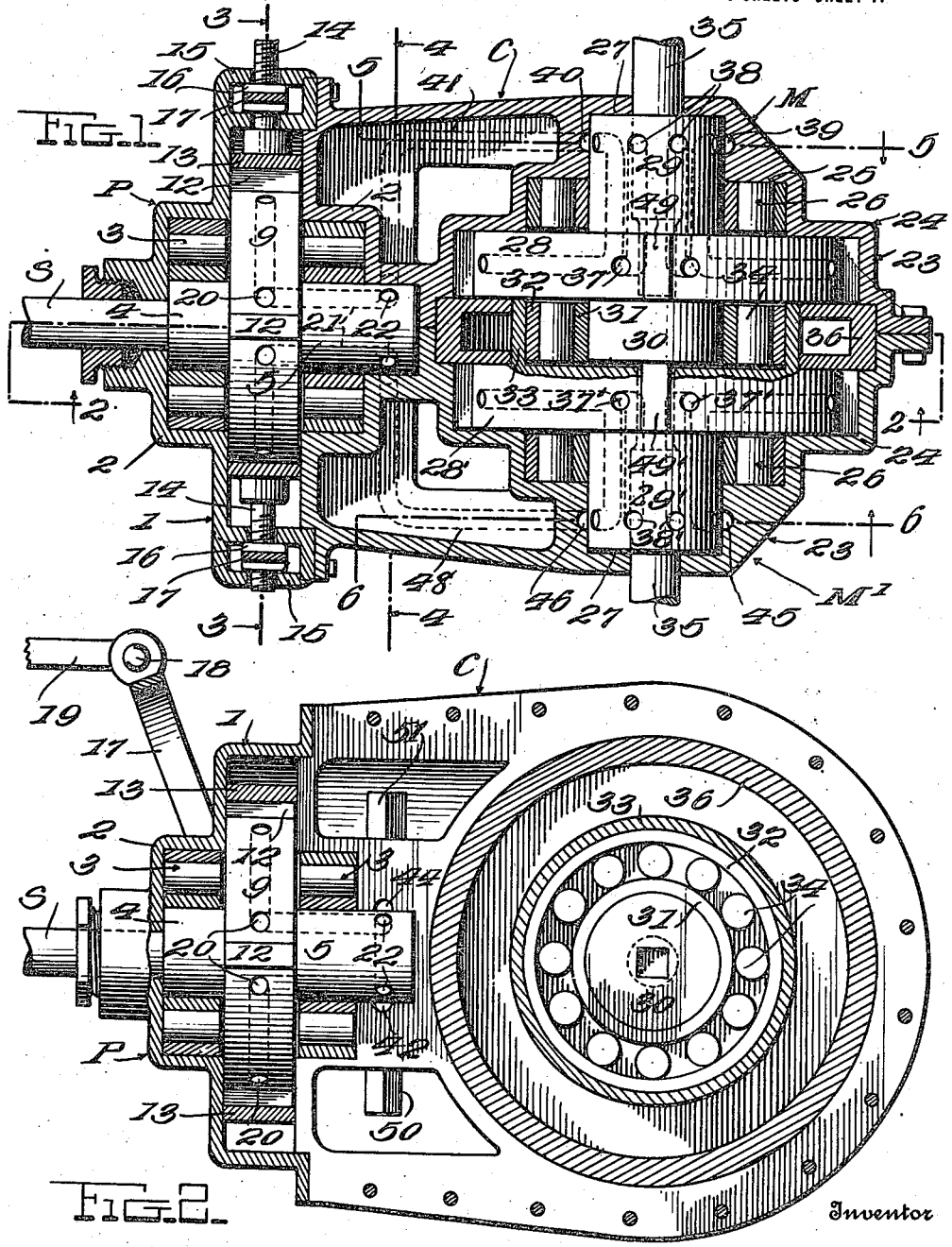
Witnesses
Inventor
Joseph Zagora.

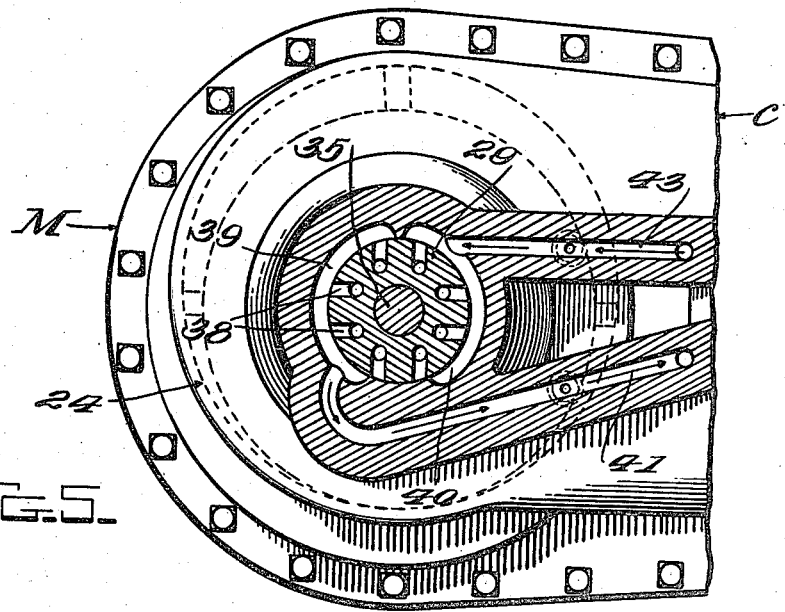
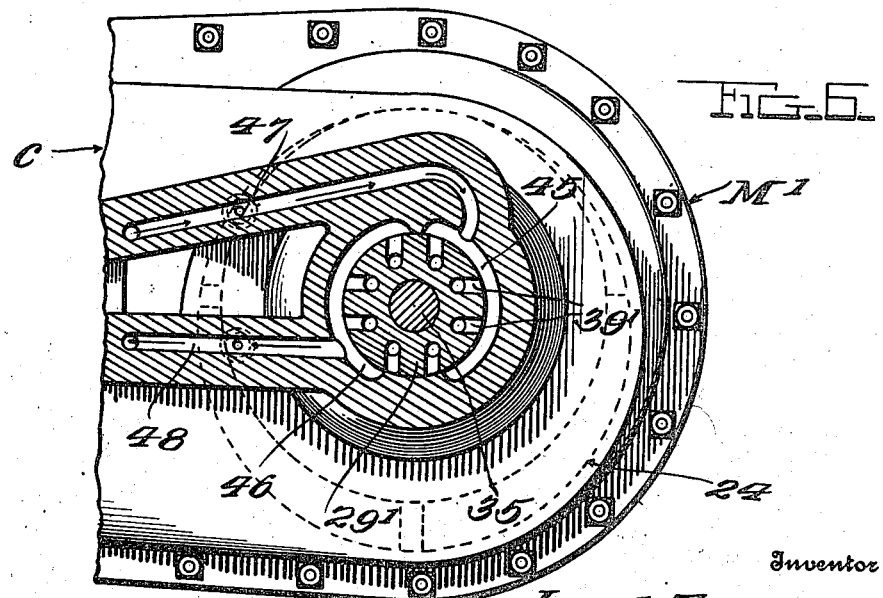

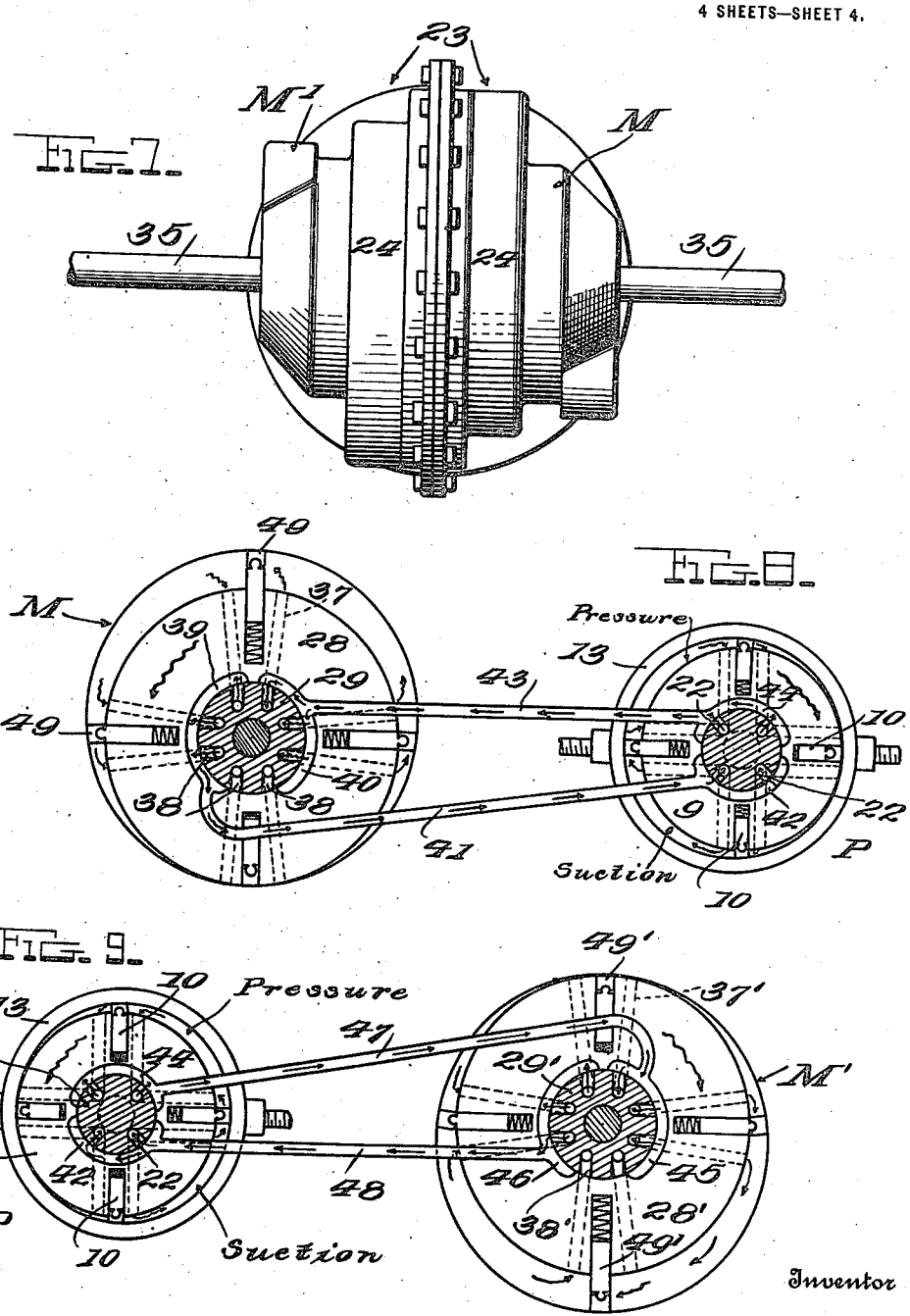

UNITED STATES PATENT OFFICE.

JOSEPH ZAGORA, OF RACINE, WISCONSIN.

COMBINED FLUID TRANSMISSION AND DIFFERENTIAL.

1,150,478.

Specification of Letters Patent.

Patented Aug. 17, 1915.

Application filed March 30, 1914. Serial No. 828,326.

*To all whom it may concern:*

Be it known that I, JOSEPH ZAGORA, a citizen of the United States, residing at Racine, in the county of Racine and State of Wisconsin, have invented certain new and useful Improvements in a Combined Fluid Transmission and Differential; and I do declare the following to be a full, clear, and exact description of the invention, such as will enable others skilled in the art to which it appertains to make and use the same.

My invention relates to improvements in transmission mechanism for automobiles and the like and has for its object to eliminate the necessity of employing a variable speed gear, a differential gear, a clutch and a reverse gear in order to properly control the same.

To the above end, my invention consists of a small and compact casing in which is located means for varying the speed of the vehicle forward or rearward, means for suspending movement of the vehicle while its motor is allowed to run, means for reversing the movement of the vehicle and means for compensating for various differences in speed of the two sections of the driving axle, the speed of the vehicle, direction of drive and suspension of movement being controlled by a single lever while all differences of speed between said axle sections are compensated for automatically.

The invention resides not only in the combination of the above mentioned elements but resides in certain novel features of construction herein described and claimed and shown in the drawings wherein:—

Figure 4:
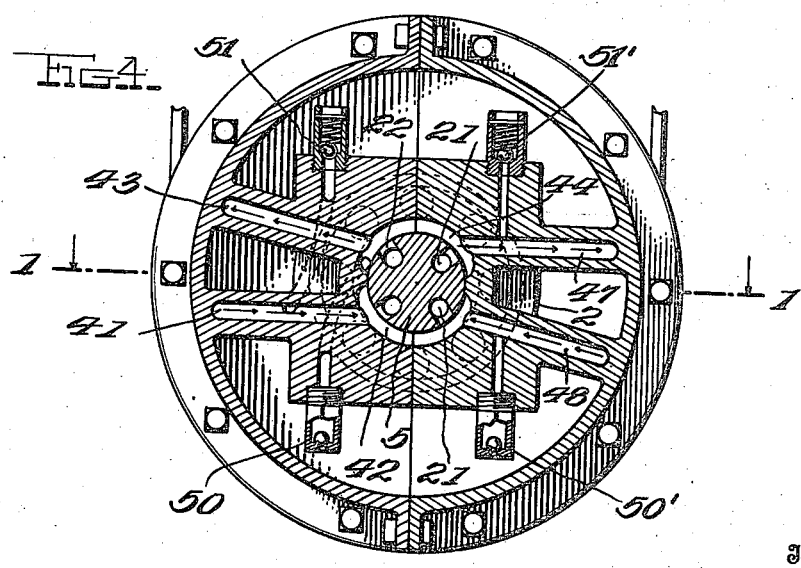

Figure 1 is a horizontal section through the center of the machine taken on the line 1—1 of Fig. 4; Fig. 2 is a central vertical longitudinal section taken on the line 2—2 of Fig. 1; Figs. 3 and 4 are transverse sections on the lines 3—3 and 4—4 of Fig. 1 respectively; Figs. 5 and 6 are detail vertical sections on the lines 5—5 and 6—6 of Fig. 1 respectively; Fig. 7 is a rear view of the invention assembled; and Figs. 8 and 9 are diagrammatic views illustrating the operation of the invention more clearly.

In the accompanying drawings, I have shown my invention as comprising a casing C in which a rotary pump P, a right hand rotary motor M and a left hand rotary motor M' are located. The pump P has its longitudinal axis disposed in parallel relation to the drive shaft S while the motors M and M' have their axes disposed in rightangular relation to said pump and the drive shaft S.

The pump P comprises a casing 1 which is of circular formation and is provided on its front and rear walls with recessed bosses 2 in which suitably constructed roller bearings 3 are located. The construction of the bearings forms no part of the present invention but it may be well for the sake of clearness, to set forth their general construction as comprising the usual inner and outer bearing rings between which the rollers are revolubly mounted. The inner rings of said bearings 3 are rigidly secured to a forward hub 4 and a rear hub 5 which are preferably formed integrally with a pump rotor 9 which is thereby revolubly mounted within the pump casing 1.

The rotor 9 is provided with radial blades 10 which are pressed normally outward by coiled springs 11 so that shoes 12 which are loosely mounted on the ends of said blades are forced into contact with the inner side of an annular cylinder ring 13 which is located between the front and rear walls of the casing 1 and is spaced from the circular wall thereof a suitable distance to allow it to be shifted laterally to bring its axis in direct alinement with the axis of the rotor 9 or to position said axes so that they possess an eccentric relation.

The above movement of the ring 13 is accomplished by providing radially projecting arms 14 on the opposite sides of said ring, passing said arms loosely through openings in the annular wall of the casing 1 and through similar openings in yokes 15 which are spaced from said annular wall, and by coarsely threading eyes 16 rigidly carried by the lower ends of levers 17 upon the extremities of said arms. The levers 17 may be actuated in any suitable manner and may be of any appropriate construction but they are preferably pivotally united at 18 to an operating link 19 which passes to any suitable point to be controlled by the operator of the vehicle to which the invention is applied. By this simple construction, when the link 19 is moved forwardly, the ring 13 will be shifted to the right hand side of the casing 1 or if it is moved toward the rear, said ring 13 will be shifted toward the left hand side of the casing. This operation will of course retract the shoes 12 which were formerly extended and will extend the shoes which were formerly retracted thus reversing the flow of the fluid which is being acted upon by the rotor 9 in a manner to be hereinafter more fully set forth. It will be clear that when the link 19 and the levers 17 are moved to a neutral position, the axes of the ring 13 and the rotor 9 are brought into alinement and the pump will then become inactive.

The pump rotor 9 is provided with a plurality of inwardly extending ports 20, one port being located in close proximity to each piston blade and shoe and said ports uniting near the center of the rotor 9 and communicating with longitudinal ports 21 which pass through the body of the hub 5 and open at 22 through the periphery thereof. The ports 20 are here shown as eight in number since four piston blades are employed and since said ports unite at their inner ends but four ports 21 are necessary. The function of the pump and its various parts and elements above described, will be more clearly brought forth near the conclusion of the specification.

The casing C is formed in two halves 23 which may be of any suitable configuration to produce the effects required. It is expedient however, that the forward wall of the casing C is of annular formation since it constitutes the rear wall of the pump casing 1. Each section 23 of the casing C is provided with an annular motor cylinder 24 which is located near the vertical center of the casing C when assembled, with an annular recess 25 in which roller bearings 26 are disposed and with a hub receiving recess 27 which is located near the outer edge of each section 23.

The cylinders 24, the roller bearings 26 and the recesses 27 coact with annular motor rotors 28 and 28', said rotors being disposed respectively in the right and left portions of the casing C. The rotor 28 is provided with an integral hub 29 which projects outwardly and is revolubly mounted within the recess 27 and carries the inner ring of the roller bearing 26. An inwardly extending hub 30 is also formed integrally with the rotor 28 and said hub 30 carries the inner ring 31 of a roller bearing while the outer ring 32 is carried rigidly by an annular flange 33 which is formed integrally with the rotor 28', suitable rollers 34 being located between said inner and outer rings 31 and 32. The rotor 28' is provided with an outwardly extending hub 29' which is revolubly mounted within the recess 27 in its respective side of the casing and is revolubly supported by the roller bearing 26 in said side. Rigidly secured within each hub 29 and 29', is a section 35 of a rear driving axle which may be connected to the rear drive wheels of the vehicle in which my invention is installed or may carry suitable gearing on their outer ends for driving said wheels.

The inner walls of the motor cylinder 24 are in the form of an annular ring 36 which is preferably channeled for the sake of lightness and is securely clamped between the two halves 23 of the casing C and has its inner edge substantially in contact with the flange 33 of the rotor 28'. By the above mounting of the rotors 28 and 28', they are allowed to rotate in the same direction but at different speeds since one of the axle sections 35 necessarily moves at a greater speed than the other section when the vehicle is rounding a curve. The rotors 28 and 28' are provided with a plurality of ports 37 and 37' which extend inwardly through their bodies, longitudinally through the hubs 29 and 29' and open at 38 and 38' through the peripheries of said hubs. Since there are eight ports in the periphery of the pump rotor 9, a like number of ports is provided in each motor rotor.

The ports 37 in the rotor 28 and its hub communicate with substantially semi-circular ducts 39 and 40 which are in the form of grooves in the wall of one of the recesses 27. The duct 39 communicates through a passage 41 with a substantially semi-circular duct 42 which is disposed beneath the inner end of the hub 5 of the pump rotor 9 and in position to register with the open ends 22 of the ports 20 and 21 in said pump rotor and said hub. The duct 40 communicates through a passage 43 with a substantially semi-circular duct 44 which is located above the hub 5 and lies in the same transverse plane with the duct 42.

The open ends 38' of the ports 37', in the rotor 28' are in communication with a substantially semi-circular duct 45 and with a similar duct 46, the duct 45 being in communication with the duct 44 by means of a passage 47 while the duct 46 communicates with the duct 42 through a passage 48. The function of these ports will be more clearly set forth.

The motor cylinder 24 on the left hand side of the machine has its axis disposed below the center of the rotors 28 and 28' while the cylinder 24 at the right hand side has its axis disposed above the axial line of said rotors. By this positioning, the piston blades 49 and 49' of the motor rotors 28 and 28' will be opposed. In other words the uppermost blade of the rotor 28 will be extended and thus more active than the lower blade of said rotor while the lower blade of the rotor 28' will be extended and will thus be more active than the upper blade thereof. This positioning of the cylinders in respect to their rotors, and the above location and arrangement of passages communicating with the pump and motor cylinders will cause a continual rotary motion to be imparted to the rotors 28 and 28', the major part of the pressure causing said motion to be exerted on the upper piston blade of the rotor 28 and on the lower blade of the rotor 28' as above suggested.

With the parts assembled and the casing C filled with oil, the operation of the device is as follows: The pump rotor 9 is rotated by the shaft S which is driven in the usual manner by the vehicle motor. This movement of the rotor will cause the oil to be drawn through inlet valves 50 and 50' until all of the ports in the entire machine are filled whereupon the extended blades of said pump rotor will force oil out of certain of the ports 20 and 21 from which it will be discharged into the duct 44 from which it will flow through the ducts 43 and 47 and to the interior of the cylinders 24 through the ports 37 and 37'. Here it will act upon the extended blades of the rotors 28 and 28' and will cause them to be driven in the same direction thus driving the axle sections 35 to propel the vehicle in one direction. Simultaneously with the forcing of oil through the passages 43 and 47, by the extended blades of the pump rotor 9, the retracted blades thereof in gradually forcing outwardly, are exerting a suction through certain of the ports 20, 21, and the passages 41 and 48 and thus said suction is also imparted to the blades of the motor rotors 28 and 28' as said blades are gradually forced inwardly against the tension of their springs. Should it be desired to reverse the movement of the vehicle, the link 19 will be shifted in the proper direction as hereinbefore set forth and the ring 13 will thereby be shifted to the opposite side of the pump casing 1 and the direction of the oil forced from the pump and returned thereto will be reversed. This will of course reverse the motion of the motor rotors 28 and 28' and the axle sections 35. In making a turn, whether the vehicle is being propelled forwardly or rearwardly, one section 35 of the drive axle will necessarily rotate at a greater speed than the other section. These differences in speed will be readily compensated for by the above described provision and arrangement of parts.

When it is desired to stop the entire vehicle but to allow its motor to continue running, it is simply necessary to move the link 19 to a neutral position and thereby through the connections of the levers 17 with the ring 13, said ring will also be brought to a neutral position and the blades on the pump rotor will be no more active on one side than on the opposite side and thus the oil within the ring 13 will be continually forced around without producing any effect whatever upon the motor rotors 28 and 28'.

With the invention so far described, I have found that considerable fluid within the various ducts and passages is lost by leakage through the bearings of the casing and that it becomes necessary to frequently replenish the supply. In order to provide for the automatic replenishing of the fluid, I provide the ducts at the upper part of the casing, with an inlet valve 50 while the ducts at the lower portion thereof are provided with an inlet valve 50'. As clearly shown in Fig. 4, the valves 50 and 50' communicate with the interior of the casing C, near its bottom, said casing being adapted to be filled with oil. It will be clearly seen, that if a partial vacuum occurs in any of the passages in the upper or lower portions of the machine, from the loss of oil, more oil will be drawn in through the valves 50 and 50', thus keeping said passages normally filled and insuring the proper operation of the machine. As a safeguard against the bursting of the apparatus, under abnormal pressure, I have provided the ports at the lower and upper portions of the casing, with outwardly opening, spring closed valves 51 and 51'.

From the foregoing description, taken in connection with the accompanying drawings, it will be seen that I have produced a comparatively simple and compact transmission for motor vehicles or the like which not only performs the function of a variable speed gear but also that of a differential gear, a reverse gear and a clutch. However, if a clutch is desired, it may be used.

I have described my invention with considerable minuteness but I do not wish to be limited to details of construction other than those amplified in the appended claims.

Having thus described my invention, what I claim as new and desire to secure by Letters Patent is:

1. In a device of the character described, a cylinder, a rotor eccentrically mounted therein, a hub on said rotor, retractable piston blades projecting from the periphery of said rotor, and contacting with the inner wall of said cylinder, combined inlet and exhaust ports opening at their opposite ends through the peripheries of said rotor and its hub, a feed duct opening to one side of said hub and a return duct opening to the other side thereof, for the purpose set forth.

2. In a device of the character described, a cylinder, a rotor eccentrically mounted therein, a hub on said rotor, retractable piston blades projecting from the periphery of said rotor, and contacting with the inner wall of said cylinder, combined inlet and exhaust ports opening at their opposite ends through the peripheries of said rotor and its hub and substantially semi-circular feed and return ducts on the opposite sides of said hub and in communication with said ports, for the purpose set forth.

3. In a fluid transmission, a casing having a pair of annular motor cylinders and an annular pump cylinder, a rotor hub receiving socket opening into one end of each of said cylinders, a motor rotor revolubly mounted in each of said motor cylinders, a pump rotor in said pump cylinder, an annular hub on each of said rotors and revolubly mounted in its respective socket, a plurality of ports opening through the peripheries of said pump and motor rotors and their hubs and communicating with said sockets, retractable piston blades on each of said rotors, and contacting with the inner wall of said cylinders, ducts connecting the socket in which the pump rotor hub revolves with each of the sockets in which the hubs of said motor rotors revolve, and means for rotating said pump rotor.

4. A fluid transmission device comprising a casing formed in two sections secured together, the contacting faces of said sections having substantially alined circular recesses constituting a pair of motor cylinders, a partition clamped between said two sections of the casing and constituting one wall of said cylinders, and a pump cylinder secured at one end to one end of the casing, combined with rotors in all of the cylinders, and ducts connecting the pump cylinder with the motor cylinders.

5. A fluid transmission device comprising a casing formed in two sections secured together, the contacting faces of said sections having substantially alined circular recesses constituting a pair of motor cylinders, a ring clamped between said two sections of the casing and constituting one wall of said cylinders, a motor rotor in one cylinder and having a hollow hub projecting into said ring, a second rotor in the other cylinder and having a hub projecting loosely into the hollow hub, and an annular bearing located in the hollow hub and surrounding the other hub, combined with a rotary pump, and ducts connecting the pump with the motor cylinders.

In testimony whereof I have hereunto set my hand in presence of two subscribing witnesses.

JOSEPH ZAGORA.

Witnesses:
CHRISTIAN JOHNSON,
J. K. OLSON.